Sept. 24, 1946.  Q. C. BARBER  2,408,248
TREATING MACHINE
Filed Aug. 10, 1945  3 Sheets-Sheet 1

INVENTOR.
QUAY C. BARBER
BY
Oberlin & Limbach
ATTORNEYS

Sept. 24, 1946.  Q. C. BARBER  2,408,248
TREATING MACHINE
Filed Aug. 10, 1945  3 Sheets-Sheet 2
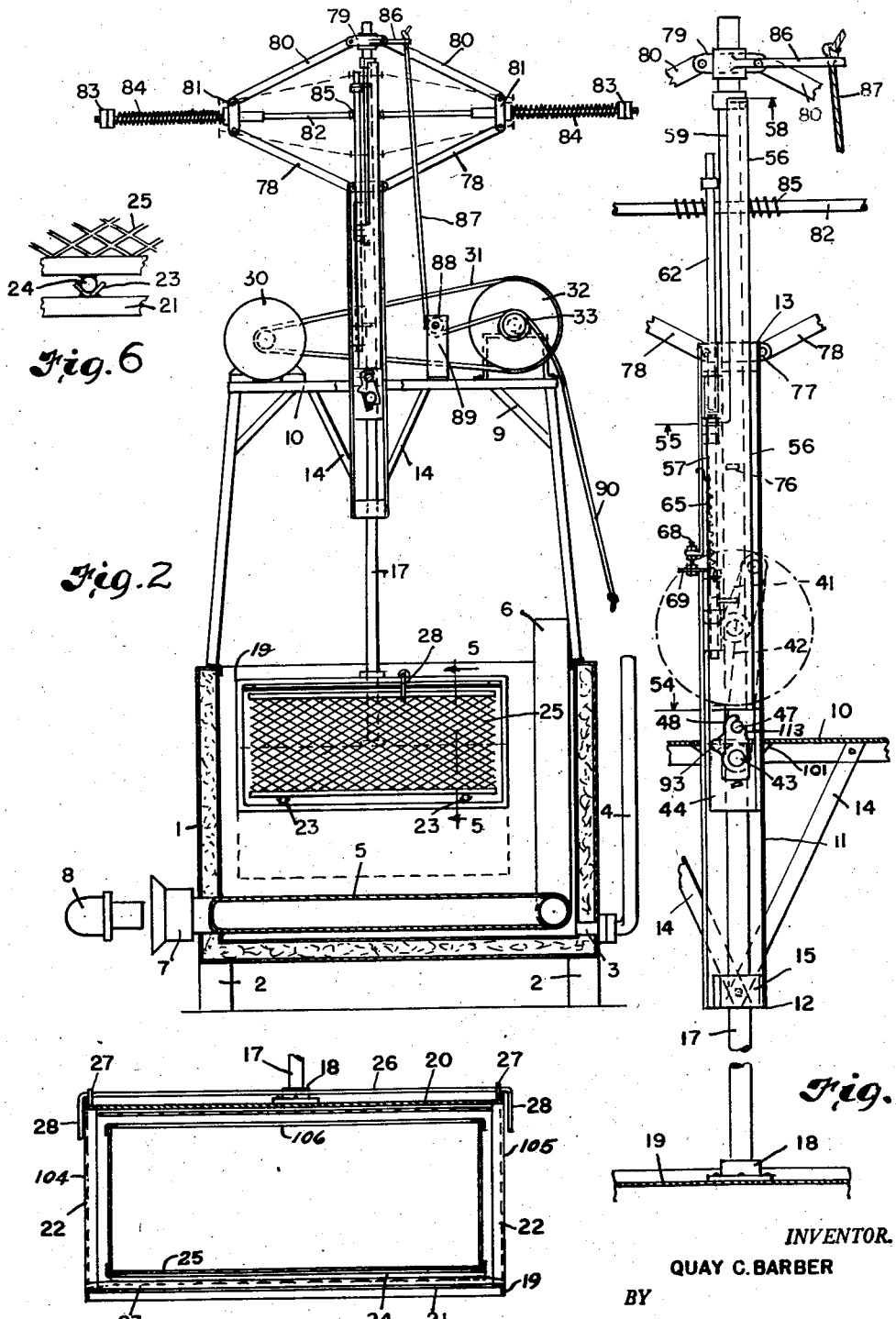
INVENTOR.
QUAY C. BARBER
BY
Oberlin & Limbach
ATTORNEYS

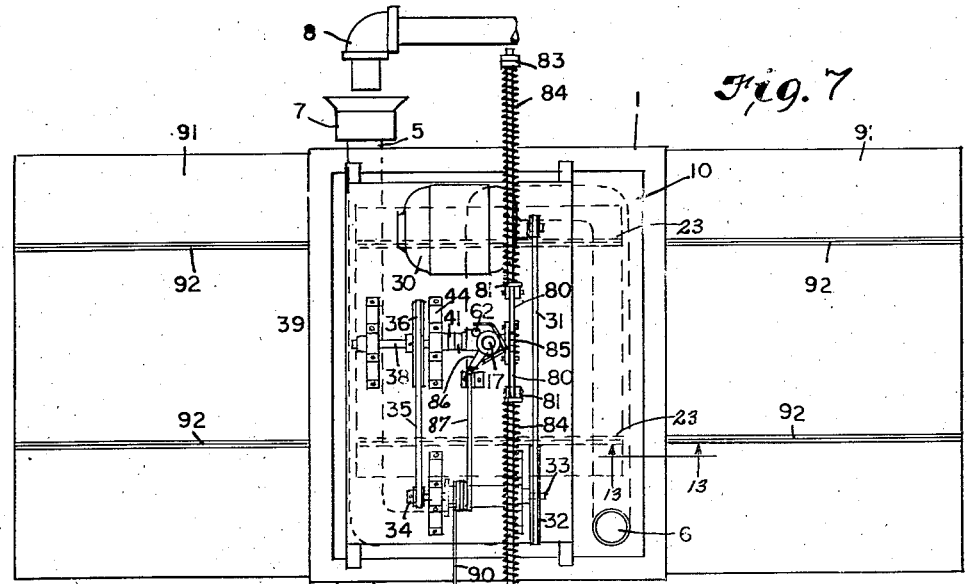
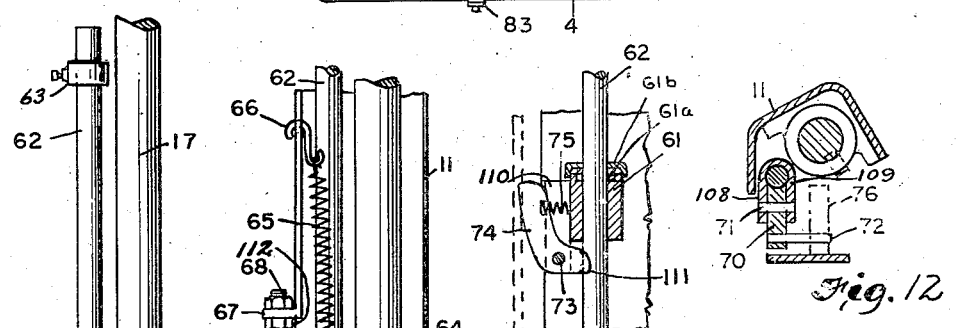
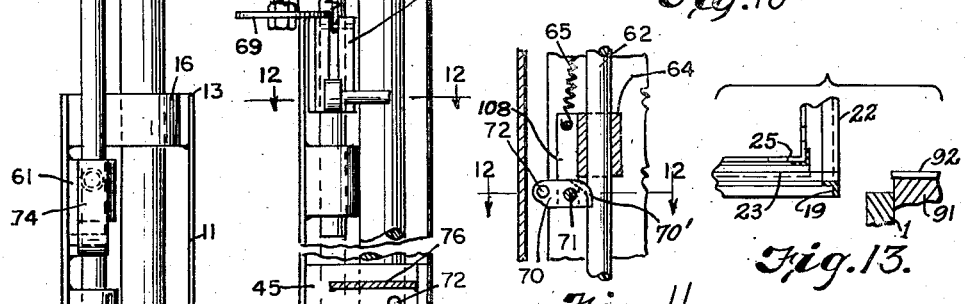
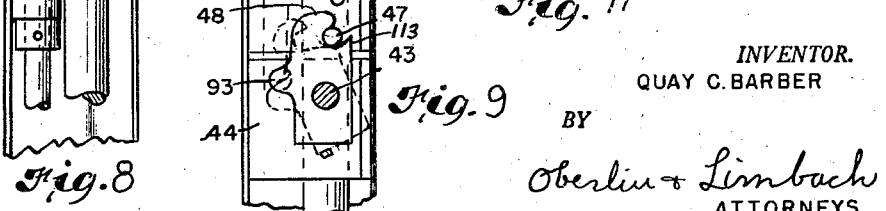

Patented Sept. 24, 1946

2,408,248

UNITED STATES PATENT OFFICE 2,408,248

TREATING MACHINE

Quay C. Barber, Cleveland, Ohio; John E. Burnside administrator of said Quay C. Barber, deceased Application August 10, 1945, Serial No. 610,133

8 Claims. (Cl. 134—46)

1

This invention relates as indicated to treating machines and more especially to a machine which is adapted to handle work-pieces which require to be immersed in a vat and which, during the immersion period, are preferably reciprocated in the vat so as to accentuate the action of the bath on the work-pieces. Machines of this character have a wide field of application, as for example in the treatment of metallic objects which require immersion in a treating or cleaning bath.

A particular field of usefulness of my improved machine is in conjunction with the cleaning and dressing of poultry wherein the poultry is required to be immersed in a scalding vat prior to the removal of the feathers therefrom.

It is a principal object of my invention to provide a machine of the character described which will perform the stated function with a minimum of attention on the part of the operator, and which machine may be manufactured and operated at a relatively low cost.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 2 is a view similar to Fig. 1 but showing the parts arranged with the work-carrying basket in the vat;

Fig. 4 is a side elevational view of that portion of the apparatus which is particularly illustrated in section in Fig. 3;

Fig. 5 is a section view of the work-supporting basket forming a part of the previously illustrated structure and taken on a plane substantially indicated by the line 5—5 in Fig. 2;

Fig. 6 is an enlarged view of a portion of the work-supporting basket showing the arrangement of rails therein on which the container immediately supporting the work is carried;

Fig. 7 is a plan view of the apparatus illustrated in Figs. 1 and 2;

Figures 1, 3:
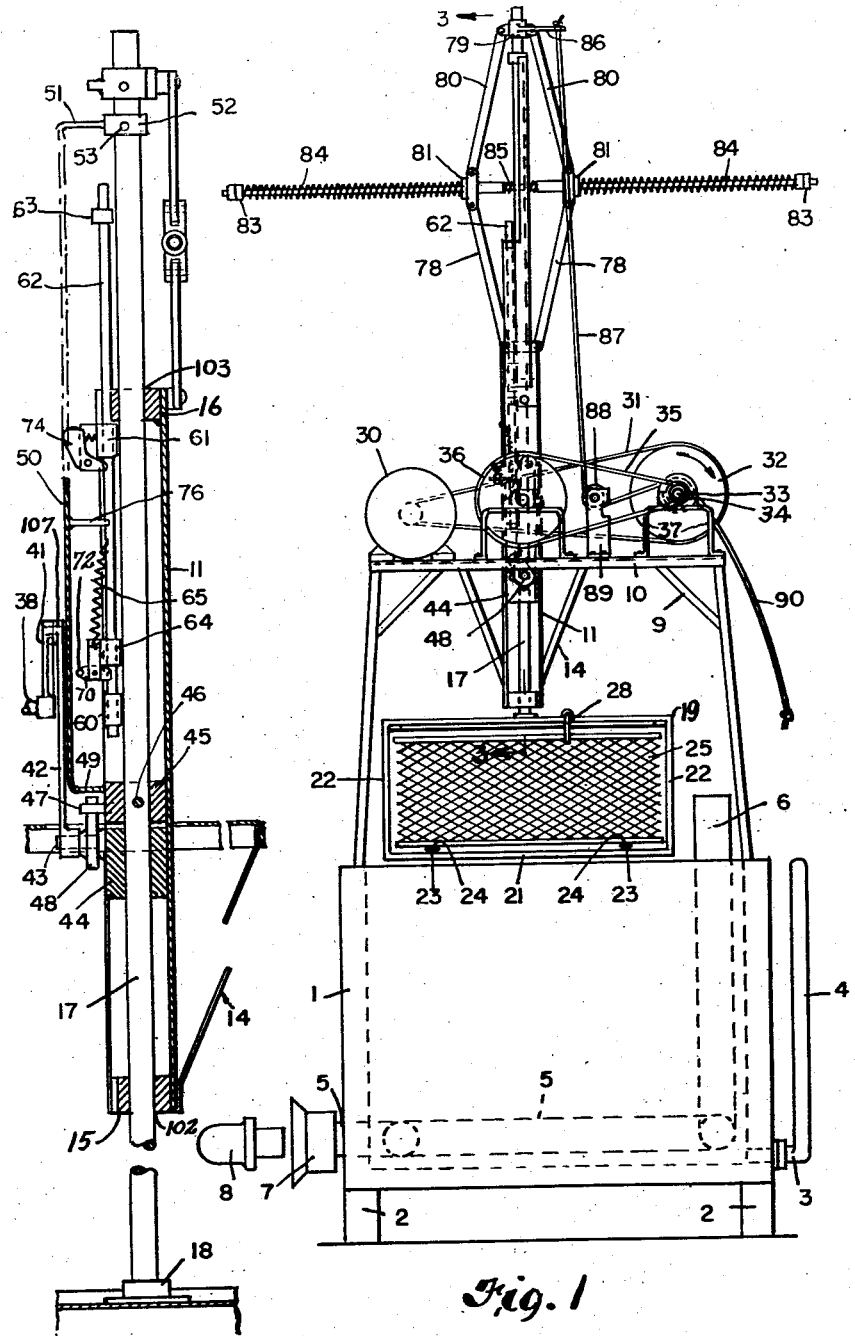
Fig. 1 is a side elevation of a machine constructed in accordance with the principles of my invention showing the arrangement of parts with the work supporting basket elevated above the vat.
Fig. 3 is a vertical sectional view drawn to an enlarged scale of the apparatus illustrated in Fig. 1 taken on a plane substantially indicated by the line 3—3.

Figs. 8, 9, 10, and 11 are each fragmentary side elevational views drawn to an enlarged scale of the center column of the apparatus with its associated mechanism; and Fig. 12 is a transverse sectional view of that portion of the apparatus shown in Fig. 9 taken on a plane substantially indicated by the line 12—12.

Fig. 13 is a section view taken along the line 13—13 of Fig. 7 showing the vertical alignment of the conveyor and container tracks.

Referring now more specifically to the drawings and more especially to Figs. 1, 2 and 7, the apparatus here illustrated includes a vat or tank generally indicated at 1 which is supported at an elevated position above the floor on suitable legs 2. The vat is fluid-tight with an open top. At one side, the vat is provided with a drain plug 3 in the form of a swivel connection carrying a pipe extension 4 so that as the discharge end of the pipe 4 is adjusted vertically, the level of liquid within the vat is similarly maintained. When it is desired to drain the vat, the pipe 4 is rotated about its swivel connection until the free end of the pipe is below the bottom of the vat, whereupon the contents of the vat will be drained through the pipe.

Extending into the vat near the bottom thereof is a conduit 5 which pursues a circuitous path overlying the bottom of the vat and terminates in a vertically projecting portion 6. The pipe 5 has a flared terminal portion 7 into which may be projected a flame as from a hydrocarbon burner generally indicated at 8. The projection of a flame into the pipe 5 serves to heat the contents of the vat and the products of combustion pass outwardly through the section 6 which serves as a flue.

Positioned on the vat is framework generally indicated at 9 formed of angle iron or the like so as to provide an elevated platform 10 on which is supported the apparatus which more particularly comprises the structure of the present invention.

As most clearly illustrated in Fig. 4, fixedly supported on the platform 10 is a main guiding and supporting member 11 which, as most clearly illustrated in Fig. 12, is generally C-shaped in cross section and which extends in Fig. 4 from the point indicated at 12 to the point indicated at 13. The member 11 is secured to the platform 10 by any suitable means such as by being welded to the platform 10 at the point of intersection as indicated at 101 and also by means of struts such as 14 shown in Fig. 4. The upper end of the member 11 is shown in Fig. 8. An intermediate portion of the member 11 is shown in Fig. 9.

The member 11 is provided at its lower end, as most clearly illustrated in Fig. 4, with a bearing block 15, and at its upper end, as most clearly illustrated in Fig. 8, with another bearing block 16. The bearing blocks 15 and 16 are secured in the C-shaped member 11 as by welding or the like, and are provided with axially aligned openings 102 and 103, respectively, in which is slidably mounted a vertically extending rod 17, to the lower end 18 of which there is attached a framework generally indicated at 19 in which the work to be treated is supported.

The framework 19 is a substantially rectangular box with one pair of open sides 104 and 105 as shown more particularly in Fig. 5. It consists of a top 20 and a bottom or platform 21 interconnected by means of vertically extending posts 22. The platform 21 is adapted to be moved to a position of alignment with loading and unloading means to be later described. Secured to the bottom 21 are spaced V-shaped rails 23 in which are adapted to be supported transversely extending rods 24 fastened to the bottom of the crate 25 within which the work to be treated is directly supported. The crate 25 is of any suitable form and is preferably a basket with foraminous sides and bottom and an open top 106. The dimension of the basket 25 is such that it will be snugly accommodated with the confines of the framework 19 during the treating operation. In order to prevent lateral displacement of the basket within the framework, the latter is provided with a rod 26 extending across the top thereof and through vertically extending brackets 27 at opposite sides. The ends 28 of the rod 26 are bent downwardly so that when in the position illustrated in Fig. 5 the basket is prevented from moving laterally out of the framework during the treating operation.

Supported on the platform 10 and also by the C-shaped member 11 is apparatus by which the framework 19 may be moved into and out of the vat 1 and vertically reciprocated while in such vat. Such apparatus includes a driving motor generally indicated at 30 which is connected by means of a belt or other driving web 31 to a pulley or sprocket 32 which is keyed to the shaft 33. Likewise keyed to the shaft 33 is a sprocket or pulley 34 about which is trained a belt or driving web 35 which passes about the sprocket or pulley 36. The shaft 33 is rotatably supported in bearings carried by the bracket members 37. The pulley or sprocket 36 is secured to a shaft 38 which is rotatably supported in bearings carried by the brackets 39 and 40.

As most clearly illustrated in Fig. 3, the end of the shaft 38 (i. e. the right-hand end as viewed in Fig. 7) has a crank arm 41 secured thereto which terminally carries a transversely extending pin 107 whereby the crank arm 41 is pivotally secured to the upper end of a link 42. The other end of the link 42 is pivotally connected to a stub shaft 43 which is carried by and extends laterally from a cross-head 44 which is loosely slidable vertically on the shaft or rod 17.

Secured to the shaft 17 above the cross-head 44 is an auxiliary cross-head 45 keyed to the shaft 17 by means of a transversely extending pin 46. Projecting laterally from the auxiliary cross-head 45 is a pin 47. Pivotally mounted on the stub shaft 43 and movable independently of the link 42 is a detent or pawl 48 which, as most clearly illustrated in Fig. 9, is adapted to engage the pin 47 and thus secure the auxiliary cross-head 45 to the main cross-head 44 so that the auxiliary cross-head is caused to reciprocate with the main cross-head when such latch is in engagement.

To the auxiliary cross-head 45 there is connected one leg 49 of a generally U-shaped frame member 50, the opposite leg 51 of which is secured by means of a collar 52 and transversely extending pin 53 to the rod 17 near its upper end.

As most clearly illustrated in Fig. 4 the web 50 in the area between lines 54 and 55 is of a width determined by the lines 56 and 57. In the area between the lines 55 and 58 the web 50 is of a width determined by the distance between the lines 56 and 59.

Fixedly attached to the inside face of the C-shaped member 11 are lugs 60 and 61. These lugs are provided with axially aligned cylindrical openings in which is slidably positioned a rod 62, to the upper end of which is secured a stop collar 63.

Lug 61 includes a helically coiled spring annulus 61a which snugly engages the rod 62 and is held on the lug 61 by a cap 61b. The spring is effective to hold the shaft 62 and the lug 61 against relative movement by gravity.

Slidable on the rod 62 is a collar 64 which is urged upwardly under the influence of a spring 65 which at its upper end is connected by means of a hook 66 to one leg of the C-shaped member 11. A portion of the same leg of the member 11 is struck outwardly as at 67 providing a slot 112 as illustrated in Fig. 9, and carries a bolt 68 which adjustably supports a stop member 69 which projects through the slot 112 in the path of the collar 64. By adjusting the nuts on the bolt 68, the position of the stop member 69 may be correspondingly adjusted and accordingly there may be an adjustment of the vertical extent to which the spring 65 may urge the collar 64.

The collar 64, as most clearly illustrated in Figs. 11 and 12 is provided with a pair of downwardly extending projections 108 and 109 between which is pivotally supported a detent 70 mounted on the transversely extending pin 71. The bottom ends of the projections 108 and 109 coincide with the lower end of the detent 70 as illustrated with respect to the projection 108 in Fig. 11.

The detent 70 carries a laterally projecting pin 72. The end 70' of the detent 70 adjacent the rod 62 is slotted as illustrated in dotted lines in Fig. 11 and is thus adapted to snugly embrace the rod, and the mounting of the detent 70 is such that when the collar 64 is moved downwardly relatively to the rod 62, the detent will jam against the rod and cause the rod and sleeve 64 to move in unison. When the sleeve 64 is moved upwardly, the slotted end 70' of the detent 70 moves away from the rod 62 to permit relative movement between the sleeve 64 and the rod 62.

As most clearly illustrated in Fig. 10, the lug 61 is also provided with downwardly projecting ears on one side thereof which similar to the projections 108 and 109, one of which is designated by reference numeral 110 in Fig. 10, support a pin 73 on which is pivotally mounted a detent 74 urged for rotation in a counter-clockwise direction on the pin 73 by means of the spring 75. The bottom ends of the ears coincide with the lower end of the detent 74 as illustrated with respect to ear 110 in Fig. 10.

The spring 75 urges the lower end 111 of the detent 74 into engagement with the rod 62 so that while the rod is free to move downwardly relatively to the collar 61, as viewed in Fig. 10, relative movement in the opposite direction is prevented by the detent so long as the latter is in engagement with the rod.

Projecting from the inner face of the web 50 is a finger 76 which projects into the path of the pin 72 so that as the member 50 moves downwardly with the auxiliary cross-head 45, when the latter is latched to the main cross-head 44, the finger 76 will strike the pin 72 and carry the sleeve 64 downwardly, carrying the shaft 62 along therewith. Such downward movement of the shaft 62 is permitted by the detent 74. However, when the finger 76 has reached the limit of its downward travel and moves upwardly again, the spring 65 will carry the collar 64 along therewith until the collar 64 strikes the stop member 69. The rod 62 is prevented from returning upwardly, however, because of its engagement by the detent 74.

Secured to the upper end 13 of the C-shaped member 11 is a collar 77 to which are pivotally secured the lower ends of toggle links 78. To the upper end of the rod or shaft 17 is secured a collar 79 to which are pivotally secured the ends of toggle links 80. The opposite ends of the toggle links 78 and 80 are pivotally secured to collars 81 which telescopically engage a transversely extending shaft 82. Stop collars 83 are secured to the ends of the shaft 82 and positioned intermediately of such collars and the collars 81 are springs 84. A spring 85 is mounted coaxially on the rod 82 intermediately of the collars 81.

Projecting laterally from the collar 79 is an arm 86 to which is secured one end of a rope or cable 87 which passes about a pulley 88 rotatably supported by the bracket 89. After thus passing about the pulley 88, the rope 87 is wound about the shaft 33 for several turns (see Fig. 7) and its free end 90 hangs downwardly at the side of the machine.

Mounted on opposite sides of the vat 1 and on a plane substantially level with the top of the vat are laterally extending conveyors 91 each provided with tracks 92 which are in alignment with the tracks 23 on the bottom of the framework 19. The apparatus is so constructed that when the framework 19 is at rest above the vat 1 the trackways 23 carried thereby are substantially in alignment with the trackways 92 so that a basket just treated may be moved out of the framework 19 onto the discharge conveyor, and another basket of material may be moved from the charging conveyor into such framework.

The operation of the above described form of apparatus is as follows:

When the parts are in the position illustrated in Fig. 1, the operator first moves a basket of material to be treated into the framework 19. After closing the latch 26, he then exerts a slight pull on the rope 90. This will tighten the several turns of such rope on the shaft 33 sufficiently so that the upper portion of the rope is wound helically on such shaft, thereby pulling downwardly on the bracket 86. Such downward pull will force the rod 17 downwardly, pushing outwardly on the springs 84 and placing the same under a tension substantially equivalent to the load of the apparatus and the work carried thereby. The downward pull on the rope 90 is continued until the auxiliary cross-head 45 moves into close proximity to the main cross-head 44, it being understood that during this time the motor 30 is running continuously and the main cross-head 44 is reciprocating continuously. As soon as the auxiliary cross-head approaches the main cross-head, the pin 47 engages the upper right hand portion of the detent 48 (see Fig. 9) and cams the same in a counter-clockwise direction about the shaft 43 to permit the pin 47 to move into latching position. The detent 48 is then moved in a clockwise direction about the shaft 43 by the action of gravity and also due to engagement of the pin 47 with the surface 113 and the detent 48 latches over the pin 47, and the auxiliary cross-head is caused to follow the main cross-head in the latter's reciprocation. As soon as the detent 48 latches over the pin 47, the downward pull on the rope 90 is discontinued and the rope 90 is thereby automatically slackened on the shaft 33. The work support carrying the basket within which the work is contained is accordingly caused to reciprocate with the main cross-head, during which interval the work basket is reciprocated vertically within the vat 1.

For each downward movement of the auxiliary cross-head while the latter is latched to the main cross-head, the consequent downward movement of the member 50 will carry the finger 76 along therewith. The finger 76, by striking the pin 72 in the manner previously explained, will cause the rod 62 to be moved downwardly for each reciprocation of the cross-heads by an increment which is dependent upon the setting of the stop member 69. The detent 70 moves the rod 62 downwardly while the detent 74 prevents the rod 62 from moving upwardly. The reciprocation of the cross-heads latched together continues until such incremental downward movement of the rod 62 is sufficient to cause the lower end thereof to engage the laterally extending projection 93 on the detent 48. Such engagement will cause a counter-clockwise rotation of the detent 48 as viewed in Fig. 9, thereby unlatching the auxiliary cross-head from the main cross-head.

The springs 84 then raise the rod 17 and its attached auxiliary cross-head 45, and the work basket carried on the lower end of the rod, upwardly out of the path of travel of the reciprocating main cross-head 44. The springs 84 move the rod 17 upwardly until the auxiliary cross-head 45 strikes the lug 60 where the upward movement of the rod 17 is arrested and the work basket held in elevated position above the vat.

As the rod 17 is moved upwardly under the influence of the springs 84, the member 50 will be carried along therewith. During the initial stages of such movement, the member 50 will frictionally engage the detent 74 causing the same to be moved in a clockwise direction against the action of the spring 75 thereby disengaging the rod 62 and permitting the rod to be shoved upwardly in its supporting sleeves by finger 76 striking collar 63, thus resetting the rod for the next cycle of operations.

From the foregoing description, it will be observed that the apparatus of my invention provides a simple means whereby the work basket is normally maintained at an elevated position above the vat and in alignment with the charging and discharging conveyors. As soon as the work basket has been loaded, a slight pull on the rope 90 sets the apparatus in operation, automatically immersing the work basket in the vat where it is reciprocated for a predetermined number of times and then automatically raised to and held in the loading and unloading position.

As previously indicated, while my apparatus has been designed primarily for use in scalding poultry for the purpose of removing the feathers therefrom, it may, nevertheless, be employed in any capacity where it is desired to move workpieces into a vat and to reciprocate them in the vat during a treating operation.

Other modes of applying the principle of the invention may be employed, change being made as regards the details described, provided the features stated in any of the following claims or the equivalent of such be employed.

I, therefore, particularly point out and distinctly claim as my invention:

1. In a device of the character described, the combination of a treating vat, a work support adapted to move into and out of said vat, means urging said work support to a position out of said vat, a cross-head, continuously operating means for reciprocating said cross-head, and means for releasably connecting said work support to said cross-head.

2. In a device of the character described, the combination of a treating vat, a work support adapted to move into and out of said vat, means urging said work support to a position out of said vat, a cross-head, continuously operating means for reciprocating said cross-head, means for effecting a releasable connection of said work support to said cross-head, and means for controlling the position of said work support relative to said cross-head for engagement of said connection while said cross-head is being reciprocated continuously.

3. In a device of the character described, the combination of a treating vat, a work support adapted to move into and out of said vat, means urging said work support to a position out of said vat, a cross-head, means for continuously reciprocating said cross-head, means for effecting a releasable connection of said work support to said cross-head, means for controlling the position of said work support relative to said cross-head for engagement of said connection while said cross-head is being reciprocated continuously, and means effective to release said connection automatically after a predetermined interval after said connection has been established.

4. In a device of the character described, the combination of a treating vat, a work support adapted to move into and out of said vat, means urging said work support to a position out of said vat, a cross-head, means for continuously reciprocating said cross-head, means for effecting a releasable connection of said work support to said cross-head, means for controlling the position of said work support relative to said cross-head for engagement of said connection while said cross-head is being reciprocated continuously, and means effective to release said connection after the occurrence of a predetermined number of reciprocations of said cross-head after said connection has been established.

5. In a device of the character described, the combination of a treating vat, a work support adapted to move into and out of said vat, means urging said work support to a position out of said vat, a cross-head, means for continuously reciprocating said cross-head, means for effecting a releasable connection of said work support to said cross-head, means for controlling the position of said work support relative to said cross-head for engagement of said connection while said cross-head is being reciprocated continuously, and means effective to release said connection automatically after an adjustably variable interval after the occurrence of a predetermined number of reciprocations of said cross-head after said connection has been established.

6. In a device of the character described, the combination of a treating vat, a work support adapted to move into and out of said vat, resilient means for urging said work support to a position out of said vat, a cross-head, power means for continuously reciprocating said cross-head vertically above said vat, means for effecting a releasable connection of said work support to said cross-head, manually controlled means for moving the work support in reach of said means for effecting a releasable connection of the work support to the cross-head while said cross-head is being reciprocated continuously, and means effective to release said connection automatically after a predetermined interval after said connection has been established.

7. In a device of the character described, the combination of a treating vat, loading and unloading rails in the same horizontal plane in alignment on opposite sides of said vat, a work support including a platform adapted to move from a position in alignment with said rails into and out of said vat, resilient means for urging said work support out of said vat and into a position with said platform in alignment with said rails, a cross-head, power means for continuously reciprocating said cross-head vertically above said vat, means for effecting a releasable connection of said work support to said cross-head, manually controlled means for moving the work support in reach of said means for effecting a releasable connection of the work support to the cross-head while said cross-head is being reciprocated continuously, and means effective to release said connection automatically after a predetermined interval after said connection has been established.

8. In a device of the character described, the combination of a treating vat, loading and unloading trackways in the same horizontal plane on opposite sides of said vat, a work support including a platform adapted to move from a position in alignment with said trackways into and out of said vat, resilient means for urging said work support out of said vat and into a position with said platform in alignment with said trackways, a cross-head, power means for continuously reciprocating said cross-head vertically above said vat, means for effecting a releasable connection of said work support to said cross-head, manually controlled means for moving the work support in reach of said means for effecting a releasable connection of the work support to the cross-head while said cross-head is being reciprocated continuously, and means effective to release said connection automatically after an adjustably variable interval after the occurrence of a predetermined number of reciprocations of said cross-head after said connection has been established to permit said first named means to restore said work support platform to and maintain the same in its loading and unloading position above said vat in alignment with said trackways.

QUAY C. BARBER.